(12) United States Patent
Detlefs (10) Patent No.: US 8,032,870 B2
(45) Date of Patent: Oct. 4, 2011

(54) TRANSACTING ACCESSES VIA UNMANAGED POINTERS

(75) Inventor: David Detlefs, Westford, MA (US)

(73) Assignee: Microsoft Corporation, Redmond, WA (US)

( * ) Notice: Subject to any disclaimer, the term of this patent is extended or adjusted under 35 U.S.C. 154(b) by 1135 days.

(21) Appl. No.: 11/821,630

(22) Filed: Jun. 25, 2007

(65) Prior Publication Data

US 2008/0320063 A1  Dec. 25, 2008

(51) Int. Cl.
*G06F 9/44* (2006.01)
(52) U.S. Cl. ........................................................ 717/131
(58) Field of Classification Search .................. 717/141, 717/146, 131; 714/763
See application file for complete search history.

(56) References Cited

U.S. PATENT DOCUMENTS

| | | | |
|---|---|---|---|
| 5,157,777 A | 10/1992 | Lai et al. | |
| 5,583,988 A * | 12/1996 | Crank et al. | 714/48 |
| 5,999,987 A | 12/1999 | O'Farrell et al. | |
| 6,085,035 A | 7/2000 | Ungar | |
| 6,138,269 A | 10/2000 | Ball et al. | |
| 6,553,384 B1 | 4/2003 | Frey et al. | |
| 6,560,774 B1 * | 5/2003 | Gordon et al. | 717/146 |
| 6,654,760 B2 | 11/2003 | Baskins et al. | |
| 6,826,757 B2 | 11/2004 | Steele, Jr. et al. | |
| 6,851,108 B1 * | 2/2005 | Syme et al. | 717/146 |
| 6,898,611 B1 | 5/2005 | Dussud et al. | |
| 7,058,954 B1 | 6/2006 | Wollrath et al. | |
| 7,076,784 B1 | 7/2006 | Russell et al. | |
| 7,086,041 B2 * | 8/2006 | Plesko et al. | 717/141 |
| 2003/0236859 A1 | 12/2003 | Vaschillo et al. | |

FOREIGN PATENT DOCUMENTS

GB  2239334 A  6/1991

OTHER PUBLICATIONS

Box et al., "Essential .NET; vol. 1: The Common Language Runtime", Nov. 4, 2002, Addison-Wesley Professional, p. 233.*
Herlihy, et al., "Software Transactional Memory for Dynamic-Sized Data Structures," Date: Jul. 13, 2003-Jul. 16, 2003. pp. 1-10.
Herlihy, et al., "Transactional Memory:Architectural Support for Lock-Free Data Structures", pp. 1-12, Aug. 2003.
Shaughnessy, Managed Code Database Advantage for the Microsoft .NET Framework Platform, Date: Sep. 11, 2004-Sep. 15, 2004, http://bdn1.borland.com/borcon2004/article/paper/0,1963,32236,00.html.

* cited by examiner

*Primary Examiner* — Anna Deng (57) ABSTRACT

Various technologies and techniques are disclosed for transacting accesses via unmanaged pointers in a transactional memory system. A transactional memory system is provided. Source code is analyzed to identify operations that create unmanaged pointers. Information is tracked about the targets of unmanaged pointer values in pointer variables. The target information is used to determine how accesses through an unmanaged pointer argument are to be transacted. When an unmanaged pointer is created, a descriptor of the target with the resulting pointer value is associated with the location. Within the method that creates the unmanaged pointer, the target can be identified using the descriptor, thereby enabling accesses to be transacted. When an unmanaged pointer is being passed as an argument, a descriptor is also passed as an argument to allow the unmanaged pointer target to be identified.

18 Claims, 7 Drawing Sheets

TRANSACTING ACCESSES VIA UNMANAGED POINTERS

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. STM is used as an alternative to traditional locking mechanisms. STM allows concurrent programs to be written more simply. A transaction specifies a sequence of code that is supposed to execute as if it were executing in isolation. This illusion of isolation is achieved by fine-grained locking of objects, and by executing in a mode that allows the side-effects of the transaction to be rolled back if the transaction is discovered to be in conflict with some other transaction. We say that a data access is "transacted" if the code generated for that access has been modified to include support for these locking and rollback mechanisms.

Different data accesses are transacted in different ways. For example, the lock that is acquired to synchronize access to a field is found in different ways depending on whether the field is a static (global) field or an instance field of some object. Rollback is enabled differently for local variables of methods than it is for object instance fields.

Some languages have a "safe subset" that omits features that allow type-safety to be violated. The full language will contain some unsafe features, whose improper use may allow type-safety violations. One example of an unsafe feature is pointer arithmetic: the ability to add an integer value to a pointer value, and dereference the resulting pointer value. If the pointer is of a type that points to type T, then whether the result is actually of type T depends on the correctness of the program, not on built-in guarantees of the language compiler and runtime. In the MICROSOFT® Common Language Runtime (CLR), for example, pointers may be "managed" or "unmanaged." A managed pointer (also called a "byref") is constant after initialization, and cannot participate in pointer arithmetic, or be cast to/from other types. Unsafe code may create unmanaged pointers, which allow all these operations.

This impacts transactional memory because a program may have a local variable, an instance field of some object o, and a static field, all of type "int," and create three unmanaged pointers to these three data locations. The type of the resulting pointer is the same in all cases, "int*" (pointer to int). If the code accesses memory via this pointer, we've lost the information necessary to transact this access in the appropriate way, which depends on the target of the pointer value.

SUMMARY

Various technologies and techniques are disclosed for transacting accesses via unmanaged pointers in a software transactional memory system. A software transactional memory system is provided. Source code is analyzed to identify operations that create unmanaged pointers. A static analysis tracks the targets of unmanaged pointer values as these values flow by assignments through the program. This target information is used to determine how accesses through unmanaged pointers are to be transacted.

When an unmanaged pointer is created within a method, it may point into several different kinds of locations. These include, as discussed previously, local variables, static variables, instance variables of heap-allocated objects, or elements of heap-allocated arrays. For each of these, the static analysis associates a descriptor of the target with the resulting pointer value. A local variable requires no transacting, and the descriptor for a static variable names the static variable (which is a compile-time constant, and thus can be named in a static analysis). When a pointer into heap allocated objects or array is created, the generated code is modified to store the object reference into a local variable allocated for that purpose, and the static descriptor indicates a heap-allocated object, and references the corresponding local variable. Then, within the method that creates the unmanaged pointer, the target of the unmanaged pointer can be identified, thereby enabling accesses to be transacted by the unmanaged pointer.

When an unmanaged pointer is being passed as an argument to a called method, a method signature is traversed to identify one or more unmanaged pointer arguments. (This is combined with a similar treatment given to managed pointer, or "byref," arguments.) At least one descriptor structure is allocated for storing a pointer descriptor for each of the unmanaged pointer arguments. This pointer descriptor will contain a dynamic version of the static information tracked by the analysis. For locals and statics, this information is the same; for heap objects, where the static analysis indicates a local variable holding a reference to the target object, this reference is copied into the dynamic descriptor. In the called method, accesses via a pointer argument are transacted according to the information stored in the corresponding descriptor.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

In one implementation, a transactional memory system is provided that allows accesses by unmanaged pointers to be transacted safely. The term "unmanaged pointer" as used herein is meant to include pointers that can be modified after they are created. A static analysis tracks the targets of unmanaged pointer values contained in pointer variables, to determine whether the pointer uses fall within a "tractable subset." The term "tractable subset" as used herein is meant to indicate language features and usage patterns that have been identified as sufficiently well behaved to allow accesses via unmanaged pointers to be transacted. The static analysis determines the target of unmanaged pointer values when they are created, and associates a descriptor of this target with the pointer value as it flows via assignment in the program. Some of these descriptors, such as those indicating that the pointer target is a local or static variable, are purely static. Others have a dynamic component—when an unmanaged pointer into the interior of a heap-allocated object or array is created, a local variable is allocated and initialized with a reference to this object or array, and the static descriptor for the pointer value references this local variable.

In one implementation, new unmanaged pointer values may also be created via pointer arithmetic, by adding an integer value to a previously-created unmanaged pointer value. We assume in such cases that the program uses unmanaged correctly; if a program uses unsafe features incorrectly, it may already exhibit arbitrary behavior, so failure to transact accesses correctly will make things no worse. If the program is correct, then it will only use pointer arithmetic to create pointers within the same data item that the original pointer value pointed to (or at least it will only perform accesses via such pointers). Therefore, the static analysis assume that static descriptor information of an unmanaged pointer value created by adding an integer to a previously-existing unmanaged pointer value is the same as the static descriptor information for that previously-existing pointer value.

Whenever an access is encountered through an unmanaged pointer, this static descriptor information is used to look up information on the target of the unmanaged pointer, which allows the access to be transacted. Whenever unmanaged pointers are passed as arguments to a method call, descriptors are also passed that allows the information about the target of the unmanaged pointer to be retrieved from within the callee method. This allows accesses via the unmanaged pointer in the callee method to be transacted.

In some situations, insufficient information is available to allow transacting an access via a pointer. If method M1 creates an unmanaged pointer to some target, and stores this pointer into a heap object, then later some method M2 reads this pointer and accesses its referent, M2 will not have any information about the target of the pointer. We say that programs where accesses via pointers within transactions all have sufficient information to allow transacting fall within the "tractable subset" of the languages; programs like the one above, where there is insufficient information to allow transacting, fall outside the tractable subset. In cases like this, the programmer can modify the program to use a "tracked pointer" instead of a raw pointer; this idea will be discussed more fully below.

Figure 1:
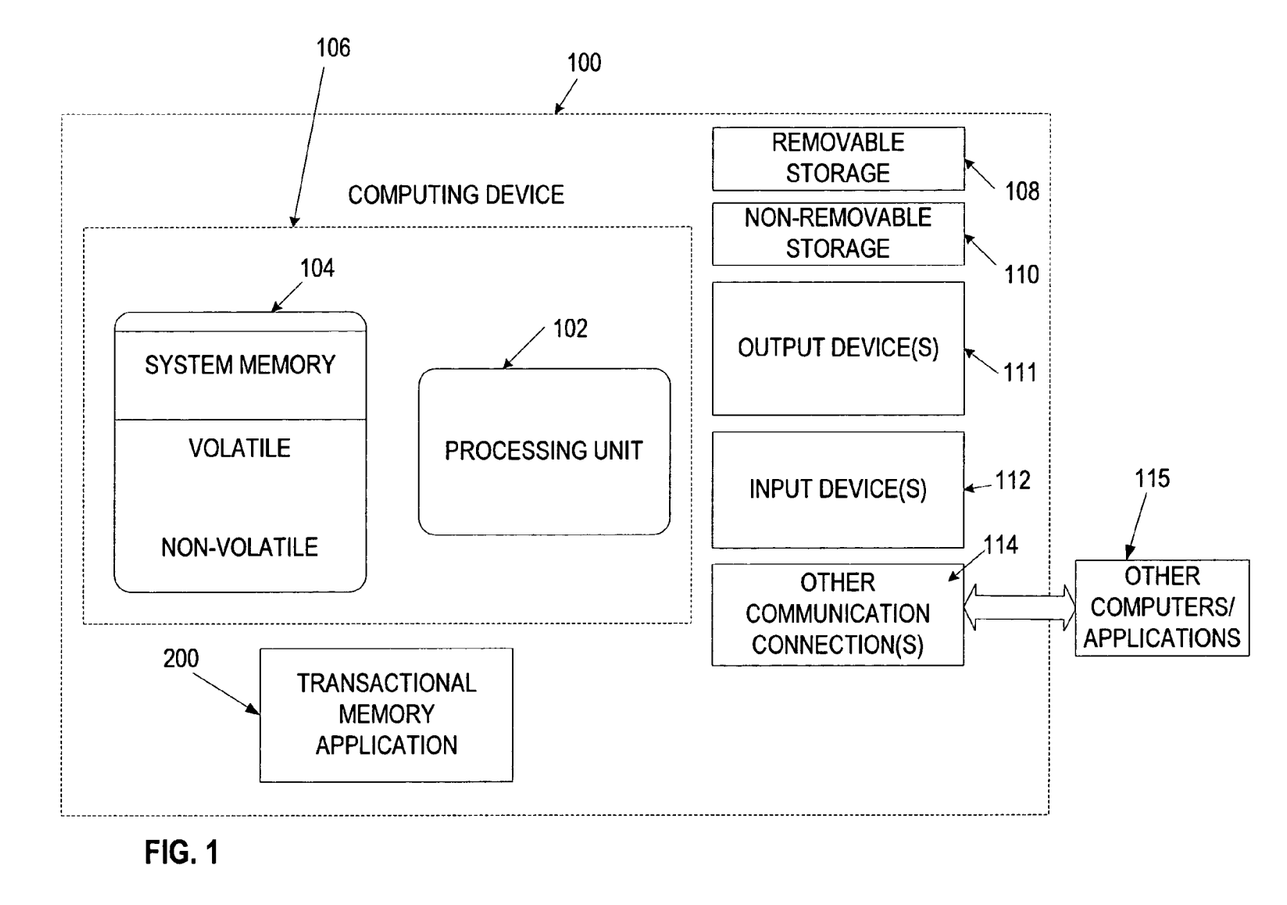
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory application 200. Transactional memory application 200 will be described in further detail in FIG. 2.

Figure 2:
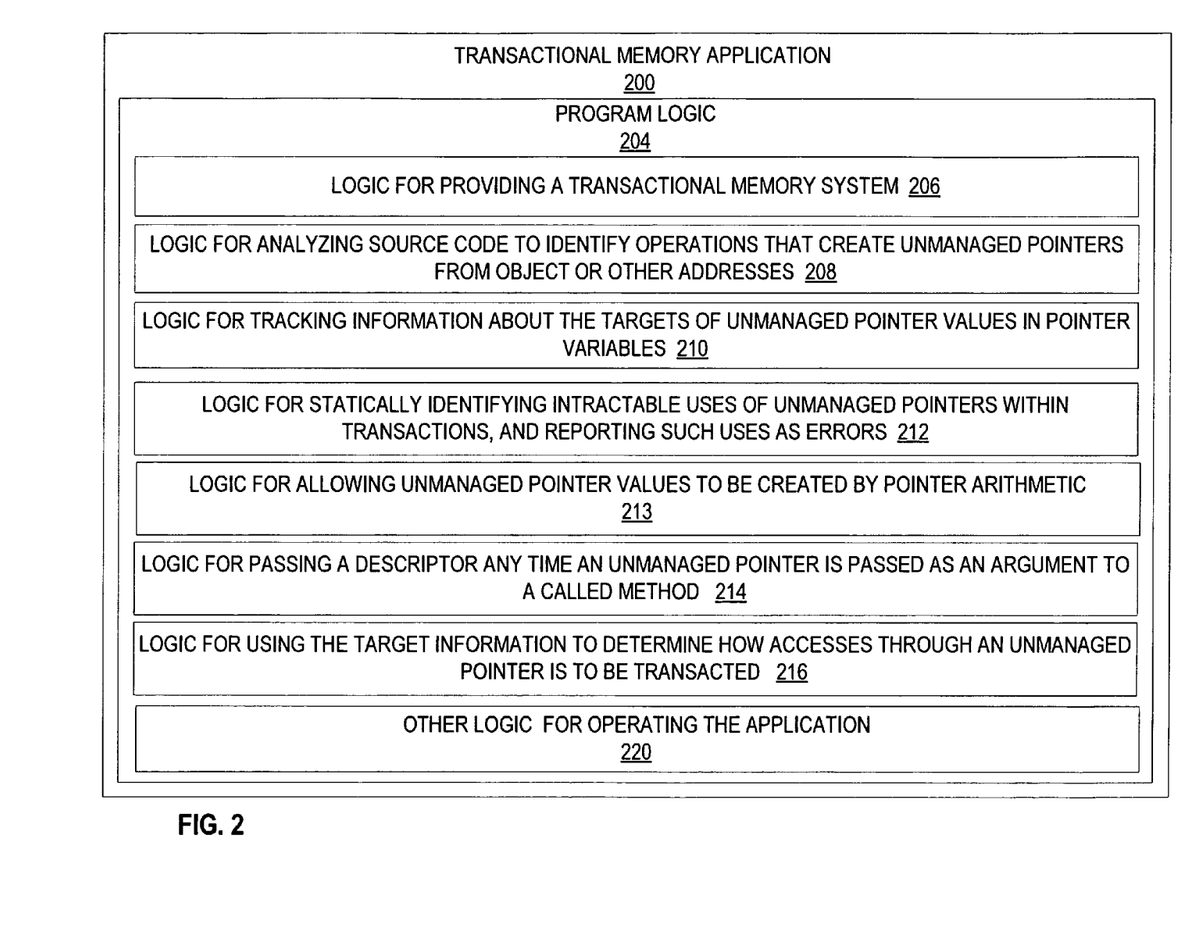
FIG. 2 is a diagrammatic view of a transactional memory application of one implementation operating on the computer system of FIG. 1.

Turning now to FIG. 2 with continued reference to FIG. 1, transactional memory application 200 operating on computing device 100 is illustrated. Transactional memory application 200 is one of the application programs that reside on computing device 100. However, it will be understood that transactional memory application 200 can alternatively or additionally be embodied as computer-executable instructions on one or more computers and/or in different variations than shown on FIG. 1. Alternatively or additionally, one or more parts of transactional memory application 200 can be part of system memory 104, on other computers and/or applications 115, or other such variations as would occur to one in the computer software art.

Transactional memory application 200 includes program logic 204, which is responsible for carrying out some or all of the techniques described herein. Program logic 204 includes logic for providing a transactional memory system 206; logic for analyzing source code to identify operations that create unmanaged pointers from object or other addresses 208; logic for tracking information about the targets of unmanaged pointer values in pointer variables 210; logic for statically identifying intractable uses of unmanaged pointers within transactions, and reporting such uses as errors 212; logic for allowing unmanaged pointer values to be created by pointer arithmetic 213; logic for passing a descriptor any time an unmanaged pointer is passed as an argument to a called method (e.g. the descriptor describing the kind of location the pointer targets, and other information necessary to identify the target, such as the address of the object into which the pointer points) 214; logic for using the target information to determine how accesses through an unmanaged pointer is to be transacted 216; and other logic for operating the application 220. In one implementation, program logic 204 is operable to be called programmatically from another program, such as using a single call to a procedure in program logic 204.

Figure 3:
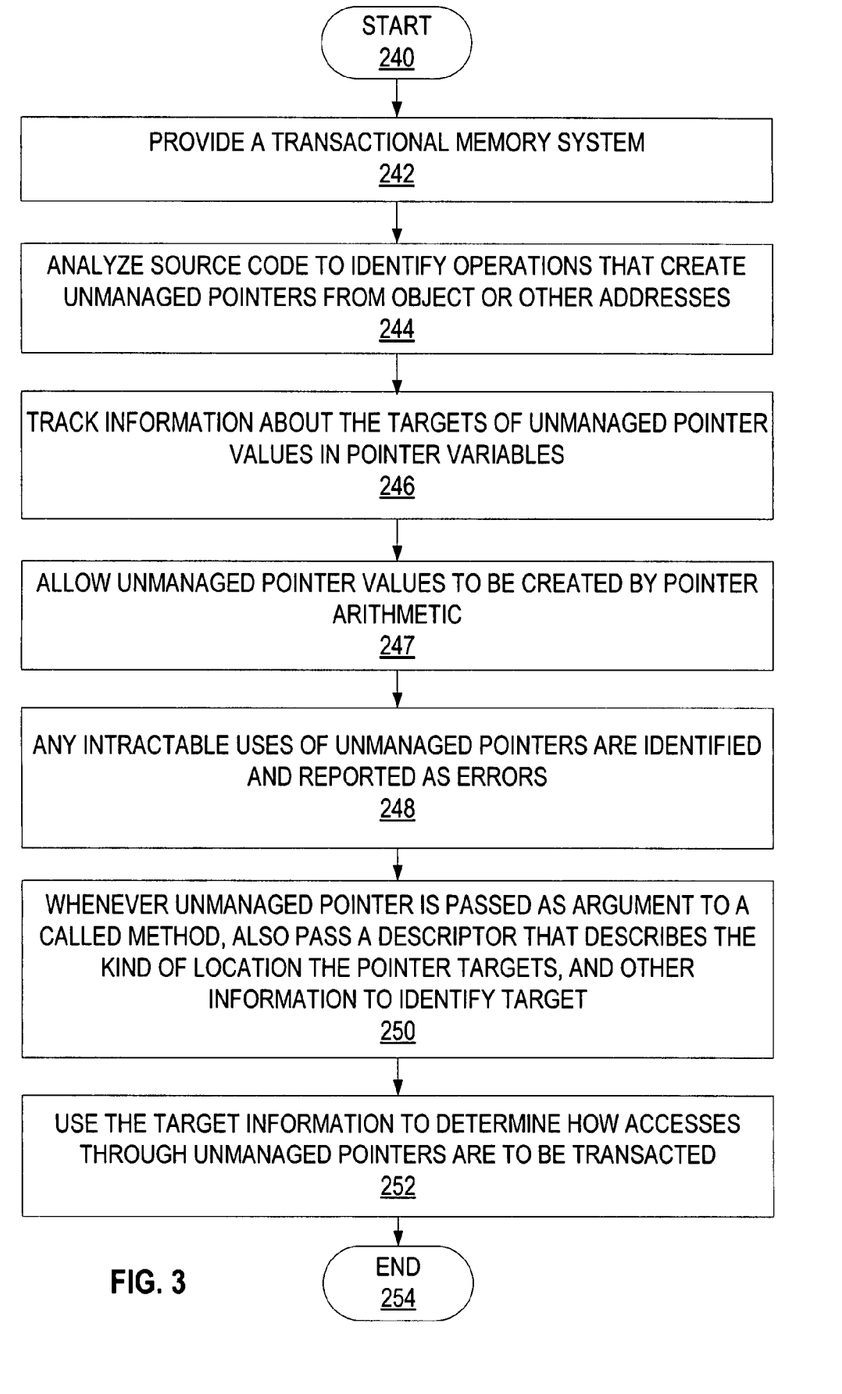
FIG. 3 is a high-level process flow diagram for one implementation of the system of FIG. 1.

Turning now to FIGS. 3-7 with continued reference to FIGS. 1-2, the stages for implementing one or more implementations of transactional memory application 200 are described in further detail. FIG. 3 is a high level process flow diagram for transactional memory application 200. In one form, the process of FIG. 3 is at least partially implemented in the operating logic of computing device 100. The process begins at start point 240 with providing a transactional memory system (stage 242). The system then analyzes the source code (e.g. intermediate language or original source code) to identify operations that create unmanaged pointers from object or other addresses (stage 244).

A static analysis tracks information about the targets of unmanaged pointer values in pointer variables (e.g. tracks the object it is a pointer into and what by-ref, objref, and unmanaged pointer values the local variables contain) (stage 246). Unmanaged pointers values may be created by pointer arithmetic, by adding an integer value to a previously-existing unmanaged pointer value (stage 247). In this case, we assume that the target information of the resulting pointer value is the same as that of the previously-existing pointer value. This reflects the assumption that the program uses unsafe features correctly, and never accesses outside the bounds of the original data item into which an unmanaged pointer points. Any intractable uses of unmanaged pointers are identified and reported as errors (stage 248). Whenever an unmanaged pointer is being passed as an argument to a called method, a descriptor is also passed that describes the kind of location the pointer targets, and other information necessary to identify the target (stage 250). The system uses the target information to determine accesses through unmanaged pointers are to be transacted (stage 252). The process ends at end point 254.

Not all allowed uses of unmanaged pointers can be tracked via a static analysis of this kind. For example, one part of a program may create an unmanaged pointer, and store it into a field of a heap object. Another part of the program may read this pointer value from the heap object, and then perform an access via this pointer. Statically, we don't have information that enables transacting of this access. We say that such non-transactable accesses fall outside of the "tractable subset" of unsafe code; the accesses we can transact via this static analysis are within the tractable subset. In cases like this, the programmer can modify the program to use a "tracked pointer" instead of a raw pointer. In one implementation, a tracked pointer will contain both a pointer value and its associated dynamic target information; when a raw pointer value is assigned to a tracked pointer, the static descriptor information on the raw pointer will be assigned to the dynamic tracked pointer, and this information will be retrieved and used when the pointer value is read from the tracked pointer.

Figure 4:
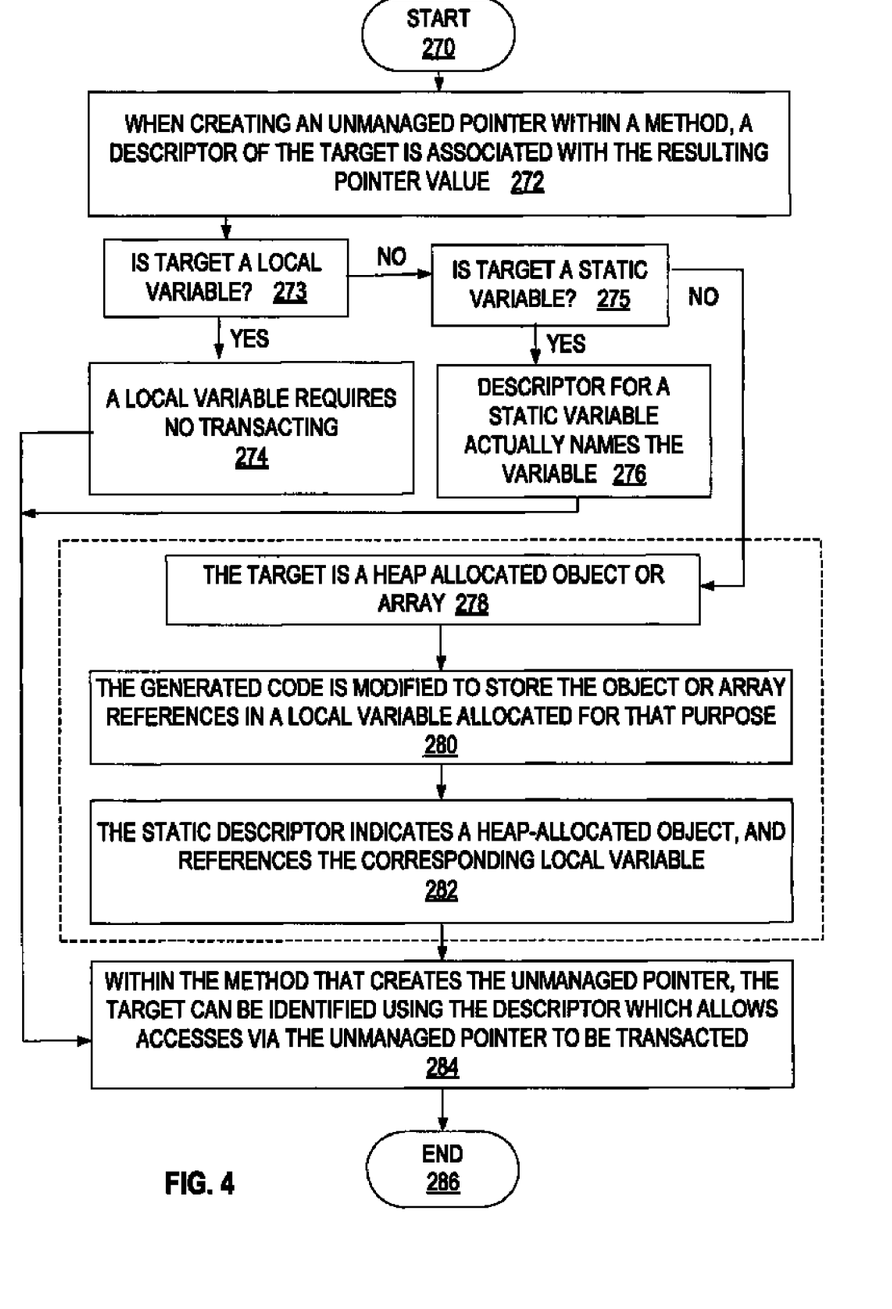
FIG. 4 is a process flow diagram for one implementation of the system of FIG. 1 illustrating the stages involved in tracking the targets of unmanaged pointer values in pointer variables to form a tractable subset.

FIG. 4 illustrates one implementation of the stages involved in tracking the sources of unmanaged pointer values in pointer variables. In one form, the process of FIG. 4 is at least partially implemented in the operating logic of computing device 100. The process begins at start point 270. When creating an unmanaged pointer within a method, a descriptor of the target is associated with the resulting pointer value (stage 272). If the target is a local variable (decision point 273), the local variable requires no transacting, so the descriptor for a pointer to a local variable indicates this (stage 274). If the target is a static variable (decision point 275), the descriptor for a static variable actually names the variable (stage 276). If the target is not a local variable or a static variable, then the target is a heap allocated object or array (stage 278). In such a case, the generated code is modified to store the object or array references in a local variable allocated for that purpose (stage 280). Furthermore, the static descriptor indicates a heap-allocated object, and references the corresponding local variable (stage 282). As discussed previously, unmanaged pointer values created by pointer arithmetic from previously-existing unmanaged pointer values inherit the static descriptor of the previous pointer value, on the assumption that a correct program will not access via an "out-of-bounds" pointer value. In any event, within the method that creates the unmanaged pointer, the target can be identified using the descriptor which allows accesses via the unmanaged pointer to be transacted (stage 284). The process ends at end point 286.

Figure 5:
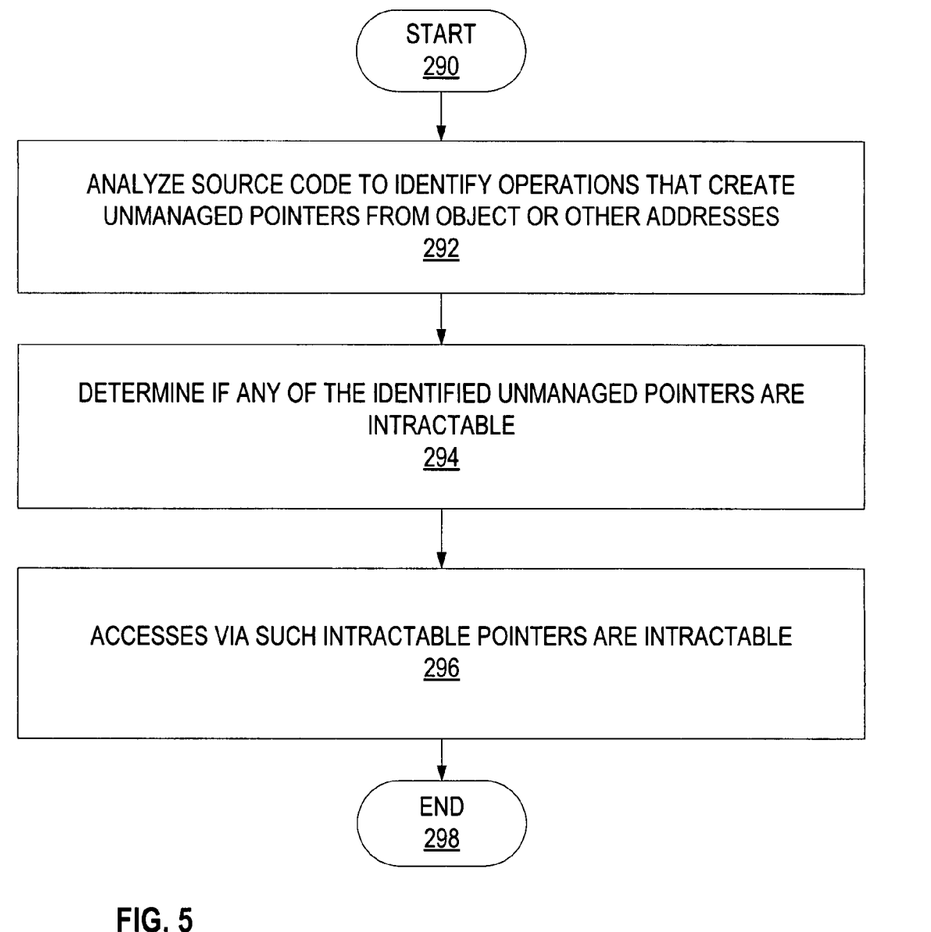
FIG. 5 is a process flow diagram for one implementation of the system of FIG. 1 illustrating the stages involved in identifying intractable uses of unmanaged pointers.

FIG. 5 illustrates one implementation of the stages involved in identifying intractable uses of unmanaged pointers. In one form, the process of FIG. 5 is at least partially implemented in the operating logic of computing device 100. The process begins at start point 290 with analyzing the source code to identify operations that create unmanaged pointers from object or other addresses (stage 292). The system determines if any of the identified unmanaged pointers are intractable (e.g. because it accesses a location via an unmanaged pointer that is not being tracked because it was not created locally) (stage 294). Accesses via such intractable pointers are intractable (stage 296). In some cases, these can be identified statically, and can be immediately reported to users as errors. In other cases, they may only be identified dynamically. For example, a method M1 may pass an intractable pointer value to a called method M2. This is an error only if M2 perform an access via this pointer value. In a separation compilation environment, when M1 is compiled we may not know whether M2 will perform an access via the pointer, and when M2 is compiled we may not know that any caller will pass an intractable pointer. The process ends at end point 298.

Figure 6:
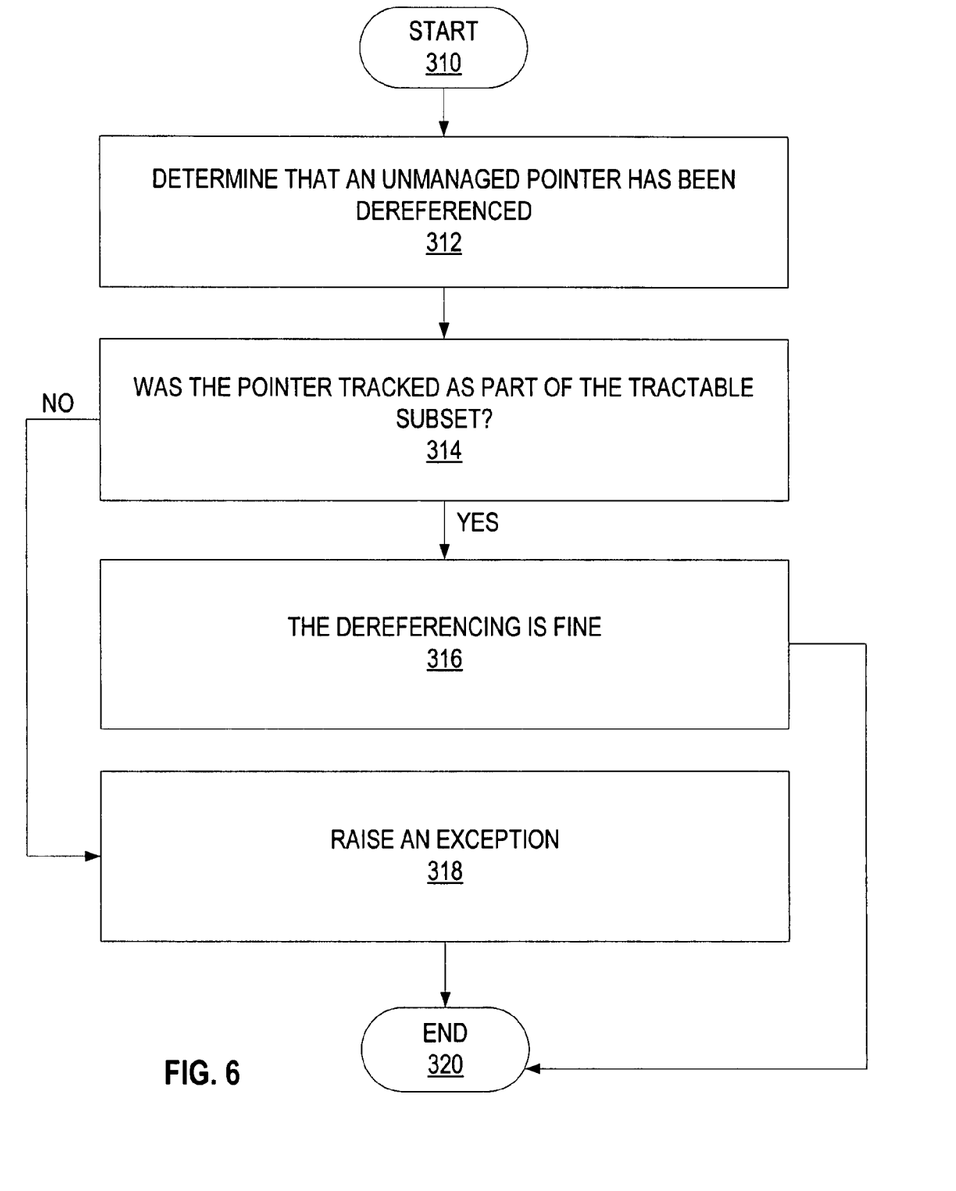
FIG. 6 is a process flow diagram for one implementation of the system of FIG. 1 illustrating the stages involved in handling unmanaged pointers that are dereferenced.

FIG. 6 illustrates one implementation of the stages involved in handling unmanaged pointers that are dereferenced. In one form, the process of FIG. 6 is at least partially implemented in the operating logic of computing device 100. The process begins at start point 310 with determining that an unmanaged pointer has been dereferenced (stage 312). If the pointer was tracked as part of the tractable subset (decision point 314), then the dereferencing is fine (stage 316). However, if the pointer was not tracked as part of the tractable subset (decision point 314), then an exception is raised (stage 318) or other appropriate action taken. The process ends at end point 320.

Figure 7:
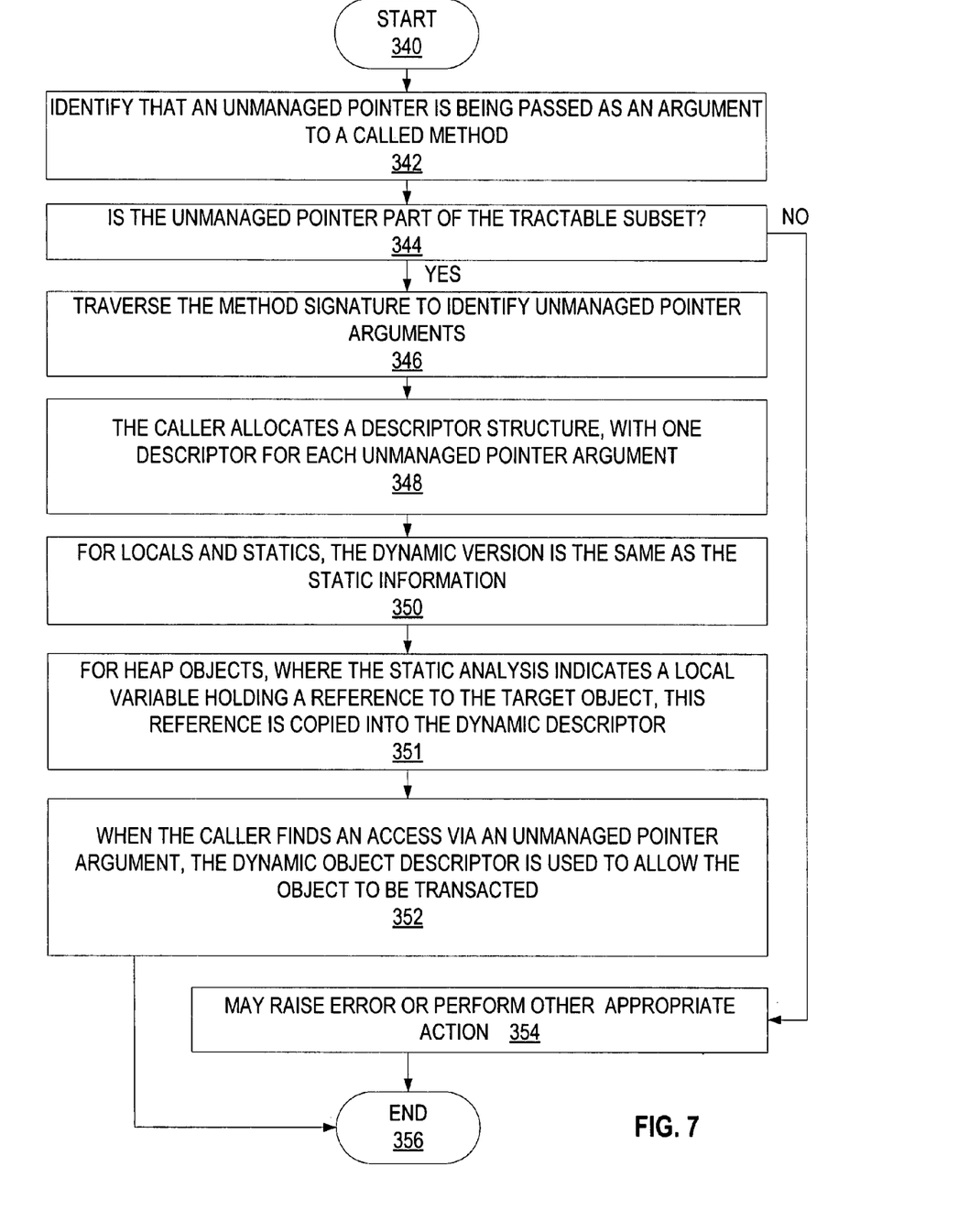
FIG. 7 is a process flow diagram for one implementation of the system of FIG. 1 that illustrates the stages involved in passing a pointer descriptor whenever an unmanaged pointer is passed as an argument to a called method.

FIG. 7 illustrates one implementation of the stages involved in passing a pointer descriptor whenever an unmanaged pointer is passed as an argument to a called method. In one form, the process of FIG. 7 is at least partially implemented in the operating logic of computing device 100. The process begins at start point 340 by identifying that an unmanaged pointer is being passed as an argument to a called method (stage 342). If the unmanaged pointer is not part of the tractable subset (decision point 344), then an error may be raised or other appropriate action may be taken (stage 354) and the process may end at end point 356. Otherwise, the unmanaged pointer may be passed to the called method, which will raise an error if the intractable pointer is dereferenced. If the unmanaged pointer is part of the tractable subset (decision point 344), the method signature is traversed to identify unmanaged pointer arguments (stage 346). The caller then allocates a descriptor structure, with one descriptor for each unmanaged pointer argument (e.g. a dynamic version of the static information tracked by the analysis) (stage 348). For locals and statics, the dynamic version is the same as the static information (stage 350). For heap objects, where the static analysis indicates a local variable holding a reference to the target object, this reference is copied into the dynamic descriptor (stage 351). When the caller finds an access via an unmanaged pointer argument, the dynamic object descriptor is used to allow the object to be transacted (e.g. for heap objects it contains a reference to the head of the heap object) (stage 352). The process ends at end point 356.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having computer-executable instructions for causing a computer to perform a method, comprising:
    analyzing source code associated with a transactional memory system to identify operations that create one or more unmanaged pointers;
    providing a static analysis that tracks targets of unmanaged pointer values and associates a respective descriptor for each of the one or more unmanaged pointers; and
    using the targets to determine how accesses through the one or more unmanaged pointers are to be transacted,
    wherein if an unmanaged pointer of the one or more unmanaged pointers points to a location that comprises a local variable, then the respective descriptor associated with the unmanaged pointer indicates that accesses via the unmanaged pointer do not need to be transacted,
    wherein if the unmanaged pointer points to a location that comprises a static variable, then the respective descriptor names the static variable,
    wherein if the unmanaged pointer points to a location that comprises a heap allocated object or array, then the respective descriptor references a corresponding local variable allocated to store an object reference for the heap allocated object or array.

2. The computer-readable storage medium of claim 1, further comprising:
    identifying intractable uses of the one or more unmanaged pointers, the intractable uses including targets that are not being tracked; and indicating errors when such intractable uses occur within a transaction.

3. The computer-readable storage medium of claim 1, wherein the static analysis tracks the targets of the unmanaged pointer values as the unmanaged pointer values flow by assignments through the transactional memory system.

4. The computer-readable storage medium of claim 1, wherein the static analysis tracks the targets of the unmanaged pointer values that are created by pointer arithmetic from previously existing unmanaged pointer values.

5. The computer-readable storage medium of claim 1, wherein an intermediate language version of the source code or an original source code is analyzed to identify the operations that create the one or more unmanaged pointers.

6. The computer-readable storage medium of claim 1, further comprising: when an unmanaged pointer of the one or more unmanaged pointers is being passed to a called method, also pass the associated respective descriptor that allows a target of the unmanaged pointer to be reconstructed in the called method.

7. The computer-readable storage medium of claim 6, wherein the respective descriptor is a dynamic version of static information tracked by the static analysis.

8. The computer-readable storage medium of claim 1, wherein the one or more unmanaged pointers are created from object or other addresses.

9. A method for tracking targets of unmanaged pointer values comprising:
    creating an unmanaged pointer within a method associated with a transactional memory system, the unmanaged pointer pointing to a target;
    associating a respective descriptor with the target,
        the respective descriptor being static when the target comprises a local or static variable, and
        the respective descriptor being dynamic when the target comprises a heap allocated object or array, wherein the dynamic respective descriptor indicates the heap allocated object or array and references a corresponding local variable storing a reference for the heap allocated object or array; and
    allowing the target to be identified using the respective descriptor, thereby enabling accesses to be transacted by the unmanaged pointer based on the respective descriptor.

10. The method of claim 9, wherein if the unmanaged pointer points to a location that is a local variable, then the respective descriptor will indicate that accesses via the pointer do not need to be transacted.

11. The method of claim 9, wherein if the unmanaged pointer points to a location that is a static variable, then the respective descriptor will actually name the static variable.

12. A computer-readable storage medium having computer-executable instructions for causing a computer to perform the method of claim 9.

13. A method for passing a pointer descriptor whenever an unmanaged pointer is passed as an argument, comprising:
    identifying that an unmanaged pointer is being passed as an argument to a called method associated with a transactional memory system;
    traversing a method signature to identify one or more unmanaged pointer arguments;
    allocating at least one descriptor structure for storing a pointer descriptor for each of the one or more unmanaged pointer arguments, the at least one descriptor structure being static when a target associated with an unmanaged pointer argument comprises a local or static variable, and the at least one descriptor structure being dynamic when the target comprises a heap object, wherein the dynamic descriptor structure includes a copy of a reference to the heap object stored in a corresponding local variable; and finding by a caller an access via an unmanaged pointer argument of the one or more unmanaged pointer arguments, wherein a pointer descriptor in the at least one descriptor structure is used to allow an object to be transacted.

14. The method of claim 13, wherein the traversing and allocating steps are only performed if accesses via the unmanaged pointer would be tractable.

15. The method of claim 13, wherein the traversing and allocating steps are not performed if accesses via the unmanaged pointer would not be tractable, and an error is instead raised.

16. The method of claim 13, wherein the respective pointer descriptor contains a reference to the heap object into which the unmanaged pointer points.

17. The method of claim 13, wherein the descriptor structure is allocated by a caller method.

18. A computer-readable storage medium having computer-executable instructions for causing a computer to perform the method of claim 13.

* * * * *